United States Patent [19]
Huber

[11] 3,822,893
[45] July 9, 1974

[54] VEHICLE AND VERTICAL SHOCK CONVERTER THEREFOR

[76] Inventor: Keith L. Huber, P.O. Box 3565, Springfield, Ill. 62708

[22] Filed: Nov. 15, 1972

[21] Appl. No.: 306,852

[52] U.S. Cl.............................. 280/124 R, 267/63 A
[51] Int. Cl............................................. B60g 11/24
[58] Field of Search.................. 280/124 R, 124 A; 267/63 R, 63 A

[56] References Cited
UNITED STATES PATENTS

| | | | |
|---|---|---|---|
| 3,073,620 | 1/1963 | Beck | 267/63 A |
| 3,580,593 | 5/1971 | Sprunger | 280/124 R |
| 3,608,926 | 9/1971 | Sprunger | 267/63 R |

Primary Examiner—Philip Goodman
Assistant Examiner—John A. Carroll
Attorney, Agent, or Firm—Hofgren, Wegner, Allen, Stellman & McCord

[57] ABSTRACT

A vehicle, such as a golf car or the like and having a vertical shock converter construction wherein the vehicle has a main frame and front and rear wheels and resilient structure connecting the rear suspension mount to the main frame of the vehicle for pivotal movement of the rear suspension mount about an axis offset from and parallel to the axis of the rear axle whereby vertical shocks transmitted to the rear wheels are substantially converted to forces acting longitudinally of the vehicle to minimize the transmission of bumps to the passengers.

3 Claims, 4 Drawing Figures

PATENTED JUL 9 1974 3,822,893

VEHICLE AND VERTICAL SHOCK CONVERTER THEREFOR

BACKGROUND OF THE INVENTION

This invention pertains to vehicles having a vertical shock converter structure whereby a vertical force imparted to the wheels of the vehicle is converted to a force acting lengthwise of the vehicle to minimize vertical forces acting on the passengers.

Insofar as known to applicant, suspension systems for the wheels of vehicles have included springs or other resilient members mounting the wheels relative to the frame of the vehicle, but with the shock forces caused by the wheels going over a bump being transmitted vertically to the vehicle frame with a resultant tendency to impart a harsh ride to a passenger. This problem is particularly acute in a lightweight personnel vehicle, such as a golf car or the like, wherein the vehicle travels over rough and uneven terrain and, unless unusual care is exercised, a passenger can be subjected to substantial up and down force resulting in a very bouncy ride. This problem is overcome in the structure disclosed in this application by mounting the suspension system for generally pivotal movement about an axis offset, but generally parallel to the axle means for the wheels and with resilient structure in the mounting partly in tension and partly in compression, whereby vertical forces applied to the wheels are converted to forces acting through the resilient members and generally longitudinal of the vehicle to avoid a bouncy ride.

SUMMARY

A principle purpose of the invention disclosed herein is to provide a smoother riding vehicle, wherein shocks imparted to the wheels are transmitted to the main frame of the vehicle in a direction acting generally longitudinal of the vehicle to avoid application of vertical shock to the passengers.

Another purpose of the invention is to provide a lightweight personnel vehicle, such as a golf car, wherein the wheels are mounted to a suspension mount by axle means and with the suspension mount connected to the main frame of the vehicle by a pair of spaced-apart generally parallel mounting plates associated one with each of the main frame and the rear suspension mount and with a plurality of resilient members secured in between the mounting plates with upper members in compression and lower members in tension to have a vertical shock received by the wheels transmitted through the resilient means in a direction acting generally longitudinally of the vehicle.

An object of this invention is to provide a new and improved lightweight personnel vehicle, such as a golf car or the like, having a shock converter mounting for the rear wheels to transmit vertical forces in a direction generally longitudinally of the vehicle to minimize shock to the passengers.

Another object of the invention is to provide a lightweight personnel vehicle as described in the preceding paragraph wherein the mounting of the rear suspension mount results in transfer of vehicle weight to the rear wheels upon acceleration of the vehicle to obtain better traction during acceleration.

DESCRIPTION OF THE PREFERRED EMBODIMENT

Figure 1:
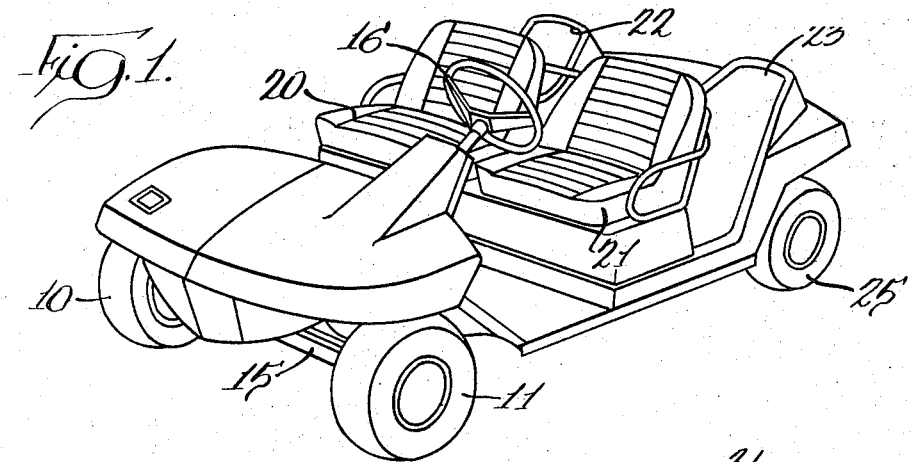
FIG. 1 is a perspective view of the lightweight personnel vehicle and, more particularly, is shown in the form of a two passenger golf car.

The vehicle is shown generally in FIG. 1 and, in the preferred embodiment, is a four-wheel vehicle with a pair of front wheels 10 and 11 mounted to a main frame 12 by suitable axle means 15 supported on the main frame and with steering mechanism for the front wheels including a steering wheel 16. The lightweight personnel vehicle in the form of a golf car has a pair of seats 20 and 21 for carrying a pair of passengers and with wells 22 and 23 formed in the body of the vehicle for holding a pair of golf bags. In the preferred construction, the frame mounting the vehicle wheels is interconnected and a durable fiber glass body is superimposed on the frame and has the wells 22 and 23 as well as provision for mounting the seats 20 and 21 and control mechanism for the power drive for the vehicle.

Figure 2:
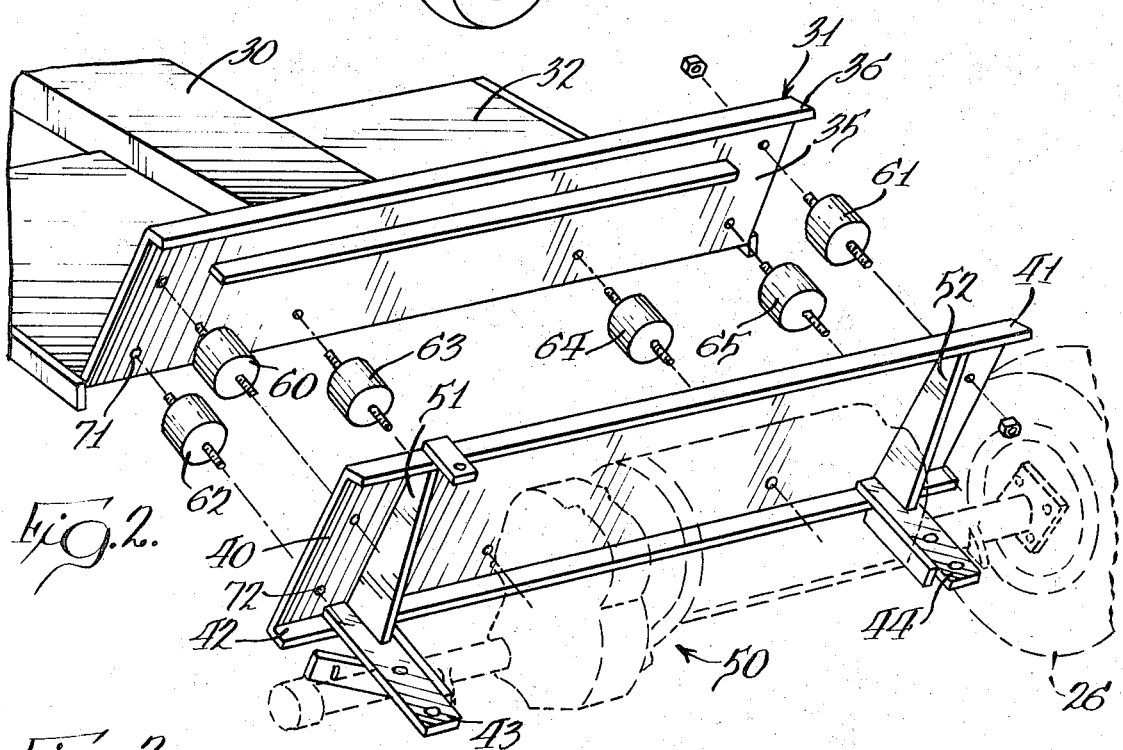
FIG. 2 is an exploded perspective view of the components of the vertical shock converter for the golf car with associated structure shown in broken line.
Figure 3:
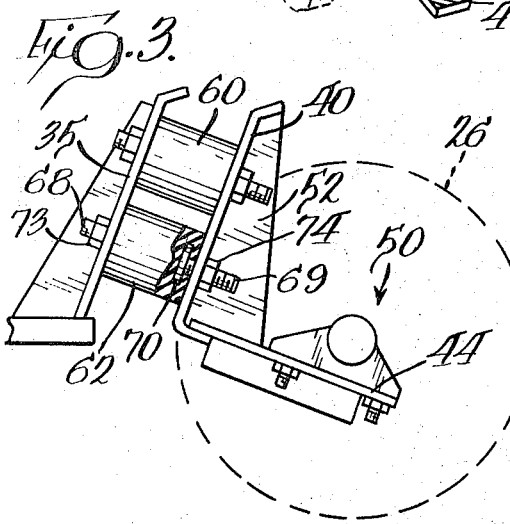
FIG. 3 is a fragmentary side elevation of the vertical shock converter structure for the vehicle as initially assembled with parts broken away.
Figure 4:
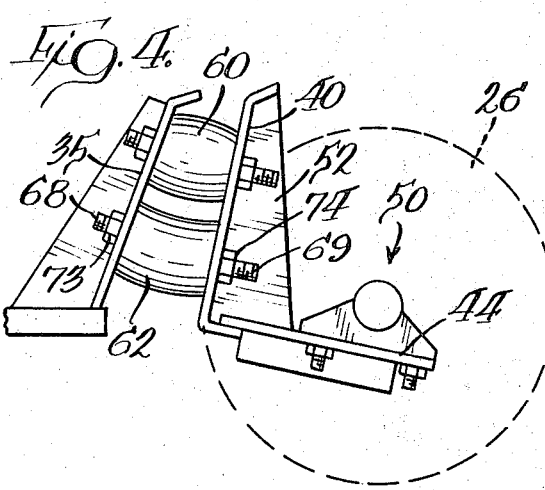
FIG. 4 is a view of the vertical shock converter, similar to FIG. 3 and showing the relation of the parts when the vehicle is in operation.

The vehicle also has a pair of rear wheels at the rear corners thereof with one of the wheels being indicated at 25 and the other wheel being shown in broken line at 26 in FIGS. 2–4.

The main frame of the vehicle includes a longitudinal beam 30 to which a Z-shaped plate, indicated generally at 31, is suitably attached by gusseting and welding. This attachment is primarily to a panel 32 of the plate 31. An additional part thereof includes a rearwardly facing mounting plate 35 having a strengthening flange 36 at the top thereof.

A rear suspension mount for the rear wheels 25 and 26 includes a mounting plate 40 having strengthening flanges 41 and 42 with a pair of axle mounting bars 43 and 44 extending rearwardly from the mounting plate 40 to mount axle means and a drive motor and transmission, indicated generally at 50, for the rear wheels 25 and 26.

These mounting bars are attached to the rear of the mounting plate 40 by gussets 51 and 52, respectively, and suitable welds.

As shown particularly in FIGS. 3 and 4, the mounting plates 35 and 40 are in spaced, generally parallel relation when assembled to each other and are interconnected by resilient means whereby the rear wheels may pivot about an axis generally parallel to and offset from the axis of the rear axle means. The resilient means includes a plurality of members of elastomeric material.

The members are arranged in upper and lower rows, with there being a pair of members 60 and 61 in an upper row and four members 62, 63, 64, and 65 in a lower row. This arrangement is shown particularly in FIGS. 3 and 4. The members 60–65 are commercially available and, as shown with respect to the member 62 in FIG. 3, each member is generally cylindrical and has a threaded member 68 extending from one end thereof and a threaded member 69 extending from the other end. Each of these threaded members is secured to the cylindrical member by a plate 70 embedded in the elastomeric material and as shown for the threaded member 69 in FIG. 3. The members 62–65 have sufficient strength to operate in tension.

Each of the resilient members is positioned between the mounting plates 35 and 40, with the threaded members of each cylindrical member extending through openings in the mounting plates as openings 71 and 72 for the cylindrical member 62 and with the parts being secured together by nuts 73 and 74 threaded onto the threaded members.

The relationship of the parts upon initial assembly is shown in FIG. 3 and the mounting plates 35 and 40 are arranged in parallel relation and extend upwardly at an angle of approximately 70° to the length of the vehicle. When the vehicle is free standing on the ground, the weight thereof results in the parts generally assuming the relation shown in FIG. 4 wherein the lower row of resilient members 62–65 are placed in tension and the upper row of resilient members 60 and 61 are placed in compression. When the rear wheels of the vehicle encounter a bump, the vertical force applied to the rear suspension mount results in a pivotal type of movement of the rear suspension mount about an axis spaced and parallel to the rear axle and is taken up by compressive and tensile forces in the resilient members 60–65. The reaction to these forces is a force acting generally longitudinally of the vehicle to avoid the transmission of vertical forces to the passengers and provide a smoother ride.

The principles embodied in this disclosure apply equally well to the mounting for the front wheels and to all types of vehicles, including passenger cars and trucks.

The mounting of the rear suspension also results in weight transfer to the rear wheels upon acceleration to provide better drive traction for the vehicle.

I claim:

1. A vehicle comprising, a main frame for the vehicle provided with means for holding at least one passenger, a plurality of front and rear wheels, and means for mounting at least some of the wheels to minimize the effect to a passenger of vertical shock on the wheels including a first mounting plate at an end of the main frame, a suspension mount having axle means mounting said wheels and a second mounting plate in spaced generally parallel relation to the first mounting plate, said mounting plates extending upwardly at an angle to and transversely of the length of said vehicle and positioned entirely between said main frame and said axle means, and resilient means mounted between said mounting plates and secured thereto with part thereof in tension and part in compression whereby said axle means is free to pivot about an axis offset and parallel to the axis of said axle means in response to a vertical force.

2. A vehicle as defined in claim 1 wherein said resilient means includes upper and lower rows of resilient members secured at their opposite ends to said mounting plates.

3. A vehicle as defined in claim 2 wherein said mounting plates are at an angle of approximately 70° to the length of said vehicle.

* * * * *